Aug. 30, 1949.                W. M. EWING ET AL                2,480,561
                            HYDROFOIL DEPTH CONTROL
                              Filed July 10, 1946

INVENTORS
WILLIAM M. EWING
JOHN L. WORZEL

BY

ATTORNEY

Patented Aug. 30, 1949

2,480,561

UNITED STATES PATENT OFFICE 2,480,561

HYDROFOIL DEPTH CONTROL

William M. Ewing and John L. Worzel, Woods Hole, Mass., assignors to the United States of America as represented by the Secretary of the Navy Application July 10, 1946, Serial No. 682,488

4 Claims. (Cl. 177—386)

This invention relates to a method of measuring distances and more particularly to a method of obtaining the distance between submerged objects.

In connection with submarine studies such as biology, photography and the like, it is often necessary to determine accurately from a point on the surface of the water that distance by which an object is located away from the bottom of the ocean. It is sometimes further desirable to measure the distance between submerged objects, as for example in connection with studying wrecks, to determine how far an object is above the wreck.

In the past, data of this character have been obtained by lowering a fathometer head in the device whose height above the bottom or other object is desired, measurements obtained being recorded at the surface. An arrangement of this character necessitates from two to four electrical leads to the fathometer head in order to send out a signal and receive the echo. The transducer unit used to send out and receive these signals is a large and heavy device requiring heavy cables leading to the surface. Accordingly, the use of such equipment is very unsatisfactory.

It is, therefore, the object of the present invention to deal with the aforestated problem.

Another object is to provide a method and apparatus for efficiently measuring the distance between an under-water object and the bottom of the ocean.

A further object is to provide a method and apparatus for measuring the distance separating under-water objects.

A still further object is to provide a method and apparatus for determining the vertical reflection coefficient of the ocean bottom.

These and other objects will be more apparent upon consideration of the following specification, taken in connection with the accompanying drawings, in which.

Briefly, a small, light microphone (or hydrophone, as it is commonly referred to) is suspended so that it coincides in position with the object whose distance from the bottom is to be determined. A standard fathometer or other signal source is provided at the surface of the water. A signal is received by the light hydrophone when sound arrives from the fathometer transducer. A second signal is received at this hydrophone after the original signal echoes from the bottom, or from some object from which distance is to be determined. By observing the time interval between these two signals received at the light hydrophone, the distance between the hydrophone and the bottom or other object may be readily calculated.

This procedure may also be used to determine the vertical reflection coefficient of the ocean bottom by placing the light hydrophone near the bottom of the ocean and then observing the difference in signal intensity between the signal before striking the bottom of the ocean and the signal after striking the bottom.

Figure 1:
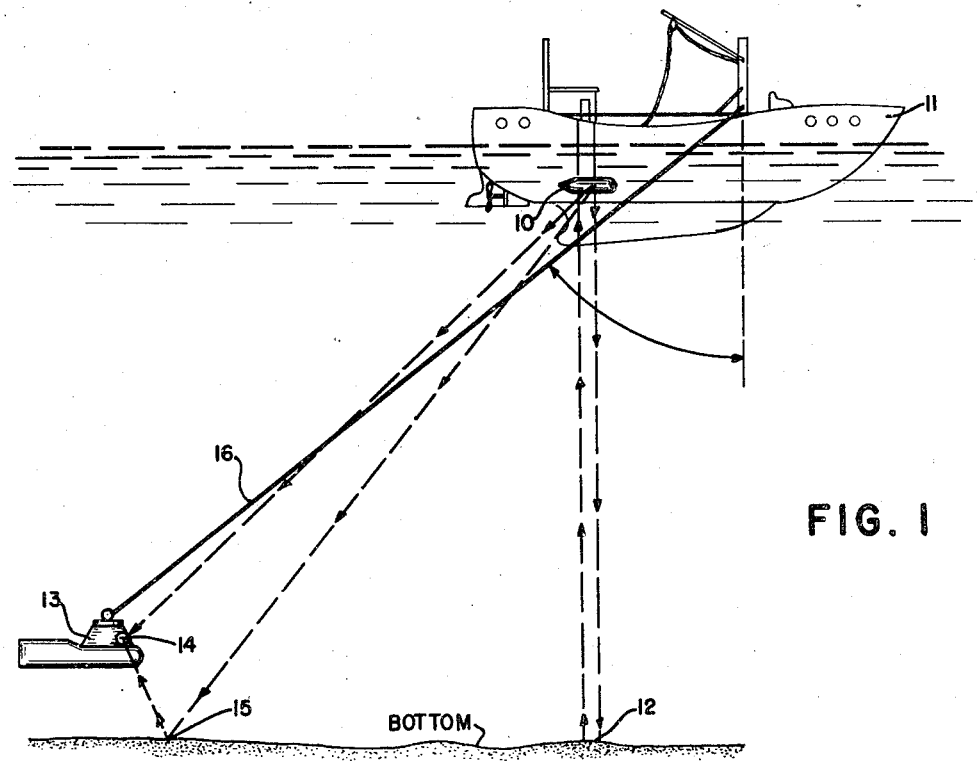
Fig. 1 is a diagrammatic view illustrating the apparatus of the invention.

Considering these features more in detail, attention is directed to Fig. 1 which indicates diagrammatically a signal being sent out from a fathometer transducer 10 on a surface ship 11. A part of this signal travels to the bottom at point 12, and returns to the ship to be recorded on the fathometer chart as in normal sounding procedures. Another part of the signal originating at fathometer 10 travels to a hydrofoil 13, which consists of a device for supporting microphone 14 under water. Still another part of the signal originating at 10 goes to the bottom at point 15, and then passes to the hydrofoil microphone 14.

Figure 2:
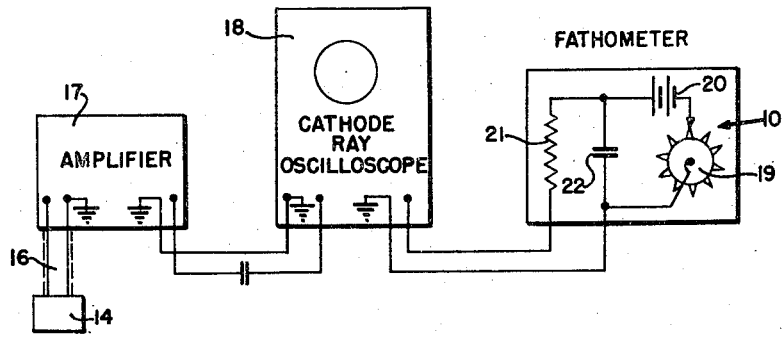
Fig. 2 is a schematic presentation of electrical equipment employed in carrying out the method of the invention.

The signals received by the hydrofoil microphone 14 are sent by cable 16 back to the ship where they are received by the apparatus shown schematically in Fig. 2. An amplifier 17 amplifies the signals and then transmits them to a cathode ray oscilloscope 18, wherein they are applied to the vertical deflection plates. The oscilloscope sweep is synchronized with fathometer 10 by a timing circuit comprised of switch 19, voltage supply 20, resistor 21, and condenser 22.

Conventional fathometers are generally provided with a keying cam that causes a signal to be transmitted for each complete revolution of the cam. Switch 19, which in this embodiment has ten contacts, may be mechanically connected to the shaft of this cam by any known means. Thus, switch 19 will make one complete revolution for each "ping" of fathometer 10.

Each time a set of contacts of switch 19 closes, condenser 22 will become charged to the potential of voltage supply 20. When the contacts of switch 19 open, the charge on capacitor 22 will leak off through resistor 21 and the input resistance (not shown) of the oscilloscope 18. This charge and discharge cycle may be employed to synchronize the sweep of oscilloscope 18 or, alternatively, the constants of resistor 21 and capacitor 22 may be chosen to provide the actual sweep voltage for oscilloscope 18. The synchronizing circuit shown in Fig. 2 is illustrative only, and it is not intended that the invention be limited by the arrangement there shown. Any means of sweep generation that may be synchronized with the transmission of signals for fathometer 10 may be substituted for the circuit shown in Fig. 2.

The difference in signal intensity between the signal before striking the ocean bottom and the signal after striking the bottom, as observed on the oscilloscope screen, serves as a basis of measurement of the vertical reflection coefficient of the bottom.

It will be seen that by observing time intervals between different signals picked up by the hydrofoil microphone, relative distances between submerged objects may be readily calculated in accordance with well known procedures. It is pointed out that the hydrofoil unit may be very light and easy to handle, with a minimum number of electrical cables extending to the surface ship. These features greatly facilitate determination of distance, especially in connection with objects such as wrecks where it may be difficult to utilize a cumbersome or complicated electrical line in close proximity to the wreck.

It will be apparent that we have provided a cheap, simple, and light-weight apparatus which, together with a special method of application, makes possible desirable underwater measurements.

While we have shown and described a preferred embodiment of our invention, it should be understood that changes and modifications may be resorted to, within the scope of the invention as defined by the appended claims.

What is claimed is:

1. The method of measuring the distance between an object submerged a substantial distance below the surface of a liquid and the bottom of said liquid, said method including the steps of transmitting a signal downwardly toward said bottom from a point adjacent the surface of said liquid, positioning said submerged object in the path of said downwardly projected signal, recording the arrival time of said signal at said object, recording the arrival time of said signal at said object after said signal has been reflected from said bottom to said object and then determining the time interval between said arrival times.

2. Apparatus for measuring the vertical reflection coefficient of the bottom of a liquid comprising means disposed adjacent the surface of said liquid adapted to transmit a signal downwardly toward said bottom, signal receiving means disposed within the path of said downwardly directed signal and adjacent said bottom, and means for recording the relative intensities of that part of the signal coming directly from said transmitting means to said signal receiving means and that part of the signal which is reflected from said bottom to said signal receiving means.

3. Apparatus for measuring the distance between an object submerged a substantial distance below the surface of a liquid and the bottom of said liquid, said apparatus comprising signal transmitting means disposed adjacent the surface of said liquid and adapted to transmit a signal downwardly toward said bottom, a hydrophone positioned at said object and in the path of said downwardly directed energy whereby said hydrophone receives signals coming directly from said transmitting means and signals reflected from said bottom, an amplifier connected to the output of said hydrophone, and a cathode ray oscilloscope connected to the output of said amplifier and synchronized from said signal transmitting means, whereby the time interval between said direct and said reflected signals are indicated.

4. The method of measuring the distance between an object submerged a substantial distance below the surface of a liquid and a reflective surface located beneath the surface of said liquid, said method including the steps of transmitting a signal downwardly toward said reflective surface from a point adjacent the surface of said liquid, positioning said submerged object in the path of said downwardly transmitted signal, recording the arrival time of said signal at said object, recording the arrival time of said signal at said object after said signal has been reflected from said reflective surface to said object and then determining the time interval between said arrival times.

WILLIAM M. EWING.
JOHN L. WORZEL.

REFERENCES CITED

The following references are of record in the file of this patent:

UNITED STATES PATENTS

| Number | Name | Date |
| --- | --- | --- |
| Re. 17,242 | McCollum | Mar. 19, 1929 |
| 2,143,035 | Smith | Jan. 10, 1939 |

FOREIGN PATENTS

| Number | Country | Date |
| --- | --- | --- |
| 416,310 | Great Britain | June 6, 1933 |